(12) United States Patent
Kobayashi et al.

(10) Patent No.: US 11,919,031 B2
(45) Date of Patent: Mar. 5, 2024

(54) COATING DEVICE AND WIPING METHOD

(71) Applicant: KYOCERA CORPORATION, Kyoto (JP)

(72) Inventors: Naoki Kobayashi, Kirishima (JP); Daisuke Hozumi, Kirishima (JP); Ryota Nagaike, Kirishima (JP); Nobuaki Yamakuchi, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 17/755,317

(22) PCT Filed: Oct. 28, 2020

(86) PCT No.: PCT/JP2020/040510
§ 371 (c)(1),
(2) Date: Apr. 26, 2022

(87) PCT Pub. No.: WO2021/085501
PCT Pub. Date: May 6, 2021

(65) Prior Publication Data
US 2022/0379338 A1    Dec. 1, 2022

(30) Foreign Application Priority Data

Oct. 28, 2019    (JP) .................. 2019-195271

(51) Int. Cl.
| | |
|---|---|
| *B05C 11/00* | (2006.01) |
| *B05C 5/02* | (2006.01) |
| *B08B 1/00* | (2006.01) |
| *B08B 1/02* | (2006.01) |
| *B08B 13/00* | (2006.01) |

(Continued)

(52) U.S. Cl.
CPC ............. *B05C 11/00* (2013.01); *B05C 5/02* (2013.01); *B08B 1/006* (2013.01); *B08B 1/02* (2013.01); *B08B 13/00* (2013.01); *B25J 11/0075* (2013.01); *B41J 2/16535* (2013.01)

(58) Field of Classification Search
None
See application file for complete search history.

(56) References Cited

U.S. PATENT DOCUMENTS 9,764,573 B2 *  9/2017  Pitz .................. B41J 25/001
2016/0184997 A1  6/2016  Uchiyama

FOREIGN PATENT DOCUMENTS

| CN | 104576464 A | 4/2015 |
|---|---|---|
| JP | 2004122067 A | 4/2004 |
| JP | 2004160801 A | 6/2004 |

(Continued)

OTHER PUBLICATIONS

Google Patents translation of JP2013139088A (Year: 2023).*
Google Patents translation of JP2012192657A (Year: 2023).*
Google Patents translation of JP2014196001A (Year: 2023).*

*Primary Examiner* — Eric W Golightly
(74) *Attorney, Agent, or Firm* — HAUPTMAN HAM, LLP

(57) ABSTRACT

A coating device includes a head, a wiping mechanism, an arm, and a controller. The head includes a nozzle surface for discharging a coating material. The wiping mechanism wipes the nozzle surface. The arm holds the head. The controller controls movement of the head via the arm. The controller relatively moves the head with respect to the wiping mechanism to wipe the nozzle surface.

18 Claims, 9 Drawing Sheets

(51) Int. Cl.
*B25J 11/00* (2006.01)
*B41J 2/165* (2006.01)

(56) References Cited

FOREIGN PATENT DOCUMENTS

| JP | 2004337770 A | 12/2004 |
| JP | 2007-136303 A | 6/2007 |
| JP | 2012192657 A | 10/2012 |
| JP | 2013139088 A | 7/2013 |
| JP | 2014196001 A | 10/2014 |
| JP | 2016-120565 A | 7/2016 |

* cited by examiner

COATING DEVICE AND WIPING METHOD

CROSS-REFERENCE TO RELATED APPLICATIONS

This application is a national stage application of International Application No. PCT/JP2020/040510, filed on Oct. 28, 2020, which designates the United States, the entire contents of which are herein incorporated by reference, and which is based upon and claims the benefit of priority to Japanese Patent Application No. 2019-195271, filed on Oct. 28, 2019.

TECHNICAL FIELD

Disclosed embodiments relate to a coating device and a wiping method.

BACKGROUND ART

A coating device using an inkjet method is known. A head for discharging a coating material and a wiper for removing the coating material attached to the head are mounted on such a coating device using an inkjet method. The coating device operates so as to wipe one side of the head for discharging the coating material by a dedicated mechanism for moving the wiper to remove the coating material attached to the head.

CITATION LIST

Patent Literature

Patent Document 1: JP 2004-160801 A
Patent Document 2: JP 2004-337770 A

SUMMARY OF INVENTION

A coating device according to one aspect of an embodiment includes a head, a wiping mechanism, an arm, and a controller. The head includes a nozzle surface for discharging a coating material. The wiping mechanism wipes the nozzle surface. The arm holds the head. The controller controls movement of the head via the arm. The controller relatively moves the head with respect to the wiping mechanism to wipe the nozzle surface.

DESCRIPTION OF EMBODIMENTS

Embodiments of a coating device and a wiping method disclosed in the present application will be described in detail below with reference to the accompanying drawings. Note that the present invention is not limited to the embodiments that will be described below.

Configuration of Coating Device

Figure 1:
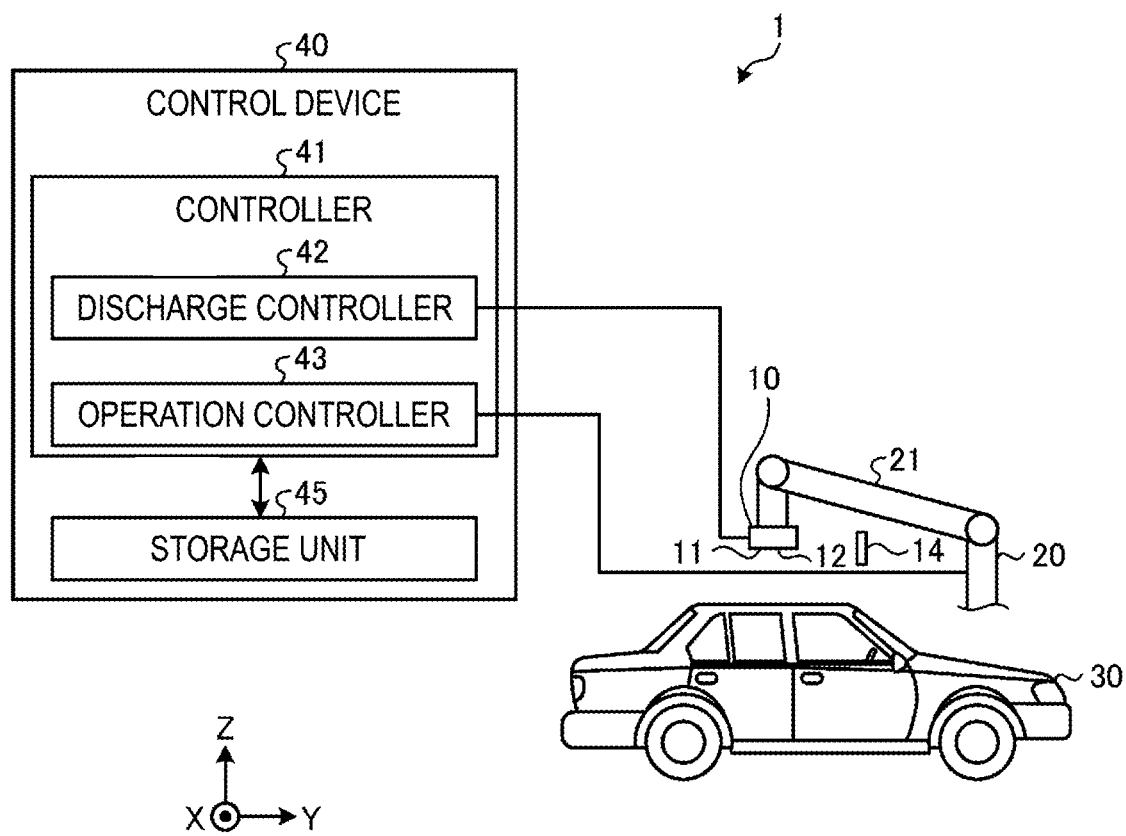
FIG. 1 is an explanatory view of a coating device according to an embodiment.

First, with reference to FIG. 1, a description will be given of an overview of a coating device according to an embodiment. FIG. 1 is an explanatory view of the coating device according to the embodiment. For the sake of clarity, FIG. 1 illustrates a three-dimensional orthogonal coordinate system including a Z-axis for which the vertically upward direction is a positive direction and the vertically downward direction is a negative direction. Such orthogonal coordinate systems may also be presented in other drawings used in the description below. The same components as those of a coating device 1 illustrated in FIG. 1 are denoted by the same reference numerals, and descriptions thereof will be omitted or simplified.

As illustrated in FIG. 1, the coating device 1 includes a head 10, a wiper 14, a robot 20, and a control device 40.

The head 10 is fixed to the robot 20. The head 10 moves in response to movement of the robot 20 controlled by the control device 40.

The head 10 coats a to-be-coated object 30 by depositing a coating material discharged from a plurality of discharge holes 11 located on a nozzle surface 12 onto a surface of the to-be-coated object 30 facing the nozzle surface 12.

The coating material is supplied to the head 10 from a tank (not illustrated). The head 10 discharges the coating material supplied from the tank. The coating material is a mixture containing a volatile component and a nonvolatile component, and has fluidity. Note that the tank may be a reservoir (not illustrated) housed in the head 10.

The volatile component is, for example, water, organic solvent, or alcohol, and adjusts the physical properties such as viscosity and surface tension of the coating material. The nonvolatile component contains, for example, a pigment, a resin material, and an additive. The pigment includes one or more colored pigments used depending on a desired coating color. The resin material is deposited on the to-be-coated object 30 and forms a film. The additive is a functional material that is added, for example for purposes of weather resistance and the like.

Note that the coating material supplied to the discharge holes 11 is prepared such that a desired coating color is expressed by mixing a plurality of colored pigments or coating materials at predetermined proportions.

The wiper 14 wipes the nozzle surface 12 of the head 10. The wiper 14 is an example of the wiping mechanism. The wiper 14 is supported by a support member (not illustrated), and is disposed near the robot 20. The wiper 14 is an elastic member having a predetermined hardness. Specifically, the wiper 14 has a hardness between a nonvolatile component contained in the coating material attached to the nozzle surface 12 and the plurality of discharge holes 11 provided in the nozzle surface 12. Thus, the nonvolatile component contained in the coating material attached to the nozzle surface 12 can be effectively removed, and deformation of the plurality of discharge holes 11 due to wear of the nozzle surface 12 can be suppressed, and thus durability of the head 10 can be improved. Note that the hardness of the plurality of discharge holes 11 provided in the nozzle surface 12 may be measured by measuring hardness of, for example, a nozzle plate serving as a member forming the nozzle surface 12.

Furthermore, the wiper 14 may be formed by wrapping a flexible material such as a woven fabric, a non-woven fabric or a paper around an elastic member. The wiper 14 is pressed against the nozzle surface 12 at a pressure within a predetermined range. When the head 10 is moved in a certain direction while maintaining this state, the coating material, in particular the nonvolatile component such as a pigment and a resin material, attached to the nozzle surface 12 is wiped from the nozzle surface 12.

The wiper 14 may be a so-called wet wiper containing an affinity component having affinity for the nonvolatile component attached to the nozzle surface 12. Here, the term "affinity" is referred to as a property of reducing adhesiveness to the nozzle surface 12 by, for example, swelling, dispersion, dissolution, or the like. When the adhesiveness between the nozzle surface 12 and the nonvolatile component is reduced, the nonvolatile component can be easily wiped. The affinity component having such affinity includes, for example, water, organic solvent, alcohol, oil, and the like, and when the affinity component has volatility, it is possible to suppress a reduction in the coating quality due to a residue of the affinity component on the nozzle surface 12.

The robot 20 holds the head 10. The robot 20 is, for example, a six-axis articulated robot. The robot 20 includes a plurality of arms 21 with the head 10 fixed to a tip of the plurality of arms 21. The robot 20 is fixed to a floor, a wall, a ceiling, or the like.

The control device 40 controls the coating device 1. The control device 40 includes a controller 41 configured to control the coating device 1, and a storage unit 45. The controller 41 includes a discharge controller 42 and an operation controller 43.

The discharge controller 42 controls the head 10 based on configuration information stored in the storage unit 45, and discharges the coating material from the plurality of discharge holes 11 toward the to-be-coated object 30. The operation controller 43 controls operations of the plurality of arms 21 based on the configuration information stored in the storage unit 45, and controls movement of the head 10 via the arms 21. The distance between the head 10 and the to-be-coated object 30 is maintained at, for example, approximately from 0.5 to 14 mm.

The operation controller 43 controls operations of the plurality of arms 21 based on the position information of the wiper 14 stored in the storage unit 45, and relatively moves the head 10 with respect to the wiper 14 to wipe the nozzle surface 12. Note that the detailed movement of the head 10 when the nozzle surface 12 is wiped by the wiper 14 will be described later.

The storage unit 45 stores configuration information for various types of controls. The storage unit 45 stores information related to discharge control of the coating material by the head 10. Further, the storage unit 45 stores information related to the operation control of the plurality of arms 21. Furthermore, the storage unit 45 stores position information of the wiper 14. Note that the storage unit 45 may store data input by the user's instruction operation using a terminal apparatus (not illustrated) as instruction data for operating the robot 20.

The to-be-coated object 30 is, for example, a vehicle body. The to-be-coated object 30 is placed on a conveying device (not illustrated), and is carried in and out. The coating device 1 according to an embodiment coats the to-be-coated object 30 in a state where the conveying device is stopped. Note that the coating device 1 may coat the to-be-coated object 30 while the to-be-coated object 30 is being repeatedly conveyed and stopped, or may coat the to-be-coated object 30 while the to-be-coated object 30 is being conveyed.

In a conventional device using the head 10, the degree of freedom of movement of the head 10 is small, and when the nozzle surface 12 is wiped, the wiper 14 is moved with respect to the head 10. Thus, there is room for improvement in terms of simplification of the configuration capable of realizing, for example, miniaturization and cost reduction. In contrast, in the coating device 1 according to the embodiment, the head 10 is fixed to the robot 20, and thus the nozzle surface 12 can be wiped by moving the head 10 with respect to the wiper 14 fixed in the vicinity of the robot 20 in accordance with the degree of freedom of the arm 21. Thus, for example, a dedicated mechanism for moving the wiper 14 toward the head 10 is unnecessary, and the configuration can be simplified.

Figure 2:
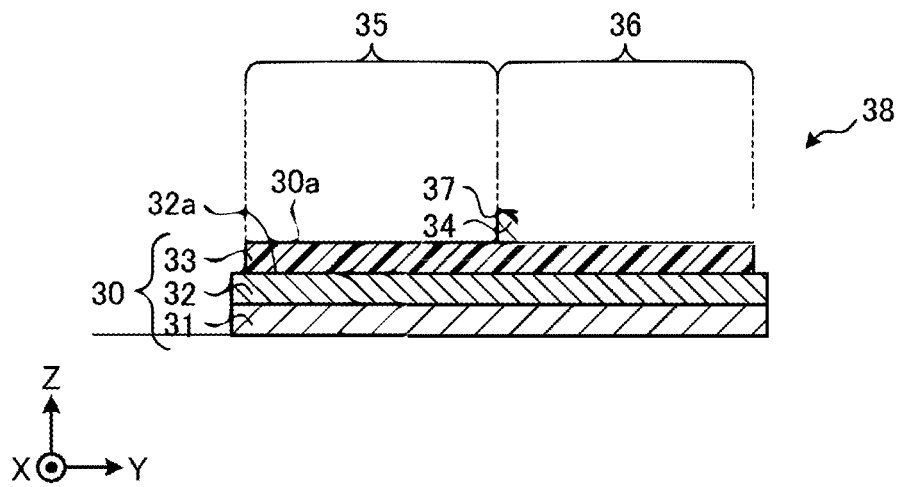
FIG. 2 is a cross-sectional view illustrating an example of a to-be-coated object that was coated.

FIG. 2 is a cross-sectional view illustrating an example of a to-be-coated object that was coated. The to-be-coated object 30 illustrated in FIG. 2 includes a base member 31, a primer layer 32, and a first coating layer 33. The base member 31 is, for example, a steel plate processed into a predetermined shape, and is subjected to an electrodeposition process as necessary to impart rust resistance thereto. The primer layer 32 is provided for imparting weather resistance, color development, and peeling resistance, for example. The first coating layer 33 is, for example, a base layer that has smoothness and weather resistance and imparts a desired coating color. A surface of the first coating layer 33 serves as a to-be-coated surface 30a to be coated by the coating device 1 according to the embodiment.

A second coating layer 34 is located on the first coating layer 33 serving as the to-be-coated surface 30a. The second coating layer 34 is located so as to cover a portion of the first coating layer 33 with a coating material having a coating color different from that of the first coating layer 33. As a result, the to-be-coated object 30 becomes a coated body 38 that is coated in a so-called two tone color in which a region 36 where the second coating layer 34 is located and a region 35 where the first coating layer 33 is exposed without the second coating layer 34 being located are aligned with an end portion 37 of the second coating layer 34 as a boundary.

In the example illustrated in FIG. 2, the coating device 1 has been described such that the second coating layer 34 is located on the to-be-coated surface 30a on the first coating layer 33, but the present invention is not limited thereto, and the coating device 1 may be applied, for example, when the first coating layer 33 is located on a coated surface 32a on the primer layer 32.

Note that the coated body 38 is not limited to the example illustrated in FIG. 2. For example, a coating layer (not illustrated) may be located on the surfaces of the regions 35 and 36. Further, the second coating layer 34 need not be included, and only the first coating layer 33 may be included, and the second coating layer 34 may be located on the entire surface of the first coating layer 33. Further, the to-be-coated object 30 or the coated body 38 may further include one or a plurality of layers (not illustrated).

First Embodiment

Figure 3:
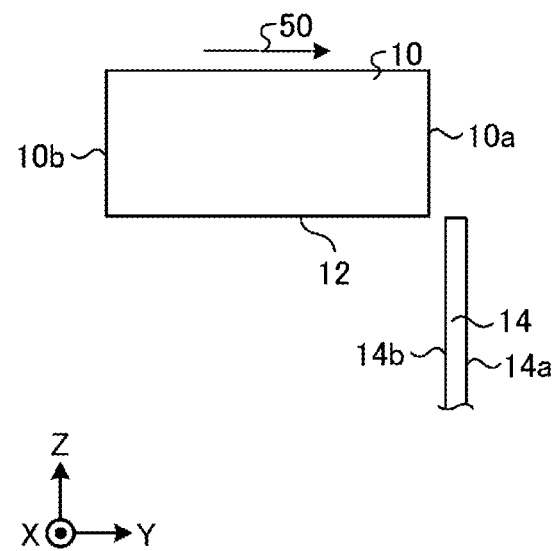
FIG. 3 is a view illustrating an arrangement example of a head and a wiper included in a coating device according to a first embodiment.

FIG. 3 is a view illustrating an arrangement example of a head and a wiper included in a coating device according to a first embodiment. The operation controller 43 (refer to FIG. 1) operates the arm 21 (refer to FIG. 1) to move the head 10 relative to the wiper 14. Specifically, as illustrated in FIG. 3, the head 10 is disposed such that a first surface 10a located along the XY plane intersecting the Z axis with respect to the wiper 14 disposed along the Z axis direction and serving as one end surface of the head 10 is in contact with or close proximity to the wiper 14. The head 10 disposed in this manner is moved in a direction 50 along the Y axis positive direction such that the nozzle surface 12 receives a predetermined pressing force from a second surface 14b of the wiper 14 from the first surface 10a side of the head 10 to a second surface 10b side serving as another end surface, and thus the nozzle surface 12 is wiped by the wiper 14.

Note that the series of operations described above may be continuously performed after the end of the coating operation, or the arm 21 (refer to FIG. 1) may be temporarily stationary before the operation of wiping the nozzle surface 12. In a case where the arm 21 is temporarily stationary before the wiping operation, position shift of the head 10 due to the movement of the arm 21 accompanied by, for example, vibration or oscillation is reduced, and accuracy of the wiping operation is improved. Note that the term "stationary" used herein is not limited to a completely stopped state, and includes, for example, a state in which the vibration or oscillation is attenuated to within a predetermined allowable range. The term "before the operation of wiping the nozzle surface 12" is not limited to before the wiper 14 and the nozzle surface 12 are brought into contact with each other, and may be, for example, after the wiper 14 and the nozzle surface 12 are brought into contact with each other and before the head 10 is moved.

Second Embodiment

Figure 4:
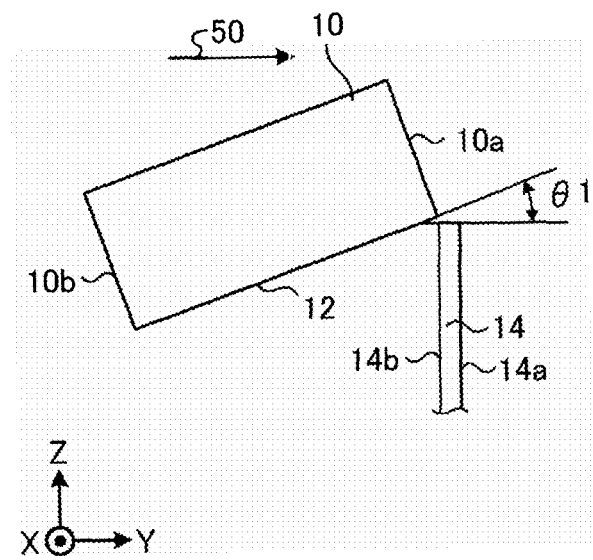
FIG. 4 is a view illustrating an arrangement example of a head and a wiper included in a coating device according to a second embodiment.

FIG. 4 is a view illustrating an arrangement example of a head and a wiper included in a coating device according to a second embodiment. The example illustrated in FIG. 4 differs from the coating device according to the first embodiment illustrated in FIG. 3 in that the nozzle surface 12 of the head 10 is inclined by an angle $\theta 1$ with respect to the XY plane.

The head 10 disposed so as to be inclined such that the nozzle surface 12 faces the wiper 14 side in this manner is moved in the direction 50 along the Y axis positive direction, and thus the nozzle surface 12 is wiped by the wiper 14 from the first surface 10a side toward the second surface 10b side. The wiper 14 is compressed or deflected toward a first surface 14a of the wiper 14 in accordance with its hardness or other characteristics, and thus the nozzle surface 12 receives a predetermined pressing force from the second surface 14b of the wiper 14. Thus, even in a case where the movement of the head 10 with respect to the wiper 14 is subjected to be the position shift, it is possible to, for example, reduce the possibility of damage to the nozzle surface 12 by canceling out the position shift by changing an amount of deformation of the wiper 14.

Here, the angle $\theta 1$ of the nozzle surface 12 with respect to the XY plane (the wiper 14) can be, for example, 10° or more and 35° or less. In a case where the angle $\theta 1$ is less than 10°, the effect of canceling out the position shift of the head 10 may not be exhibited. Furthermore, in a case where the angle $\theta 1$ exceeds 35°, the amount of change of the wiper 14 increases, and the wiper 14 may be easily damaged.

Variation of Second Embodiment

Figure 5:
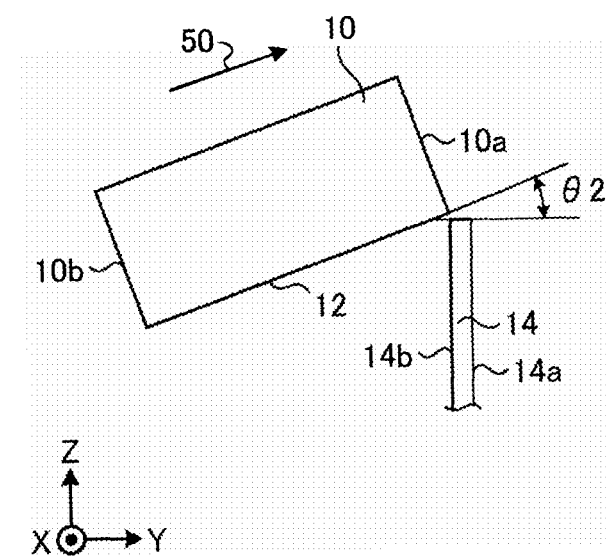
FIG. 5 is a view illustrating an arrangement example of a head and a wiper included in a coating device according to a variation of the second embodiment.

FIG. 5 is a view illustrating an arrangement example of a head and a wiper included in a coating device according to a variation of the second embodiment. The example illustrated in FIG. 5 differs from the coating device according to the second embodiment illustrated in FIG. 4 in that the direction 50 in which the head 10 moves is along the nozzle surface 12 inclined by an angle $\theta 2$ with respect to the XY plane. Also in the case where the direction 50 is inclined in this manner, similarly to the coating device according to the second embodiment, for example, it is possible to reduce the possibility of damage to the nozzle surface 12 by canceling out the position shift of the head 10 with respect to the wiper 14.

Here, the angle $\theta 2$ of the nozzle surface 12 with respect to the XY plane (the wiper 14) can be, for example, 10° or more and 35° or less. In a case where the angle $\theta 2$ is less than 10°, the effect of canceling out the position shift of the head 10 may not be exhibited. In a case where the angle $\theta 2$ exceeds 35°, the pressing force due to the wiper 14 is difficult to be transferred to the nozzle surface 12, and a wiping failure of the nozzle surface 12 may occur.

Third Embodiment

Figure 6:
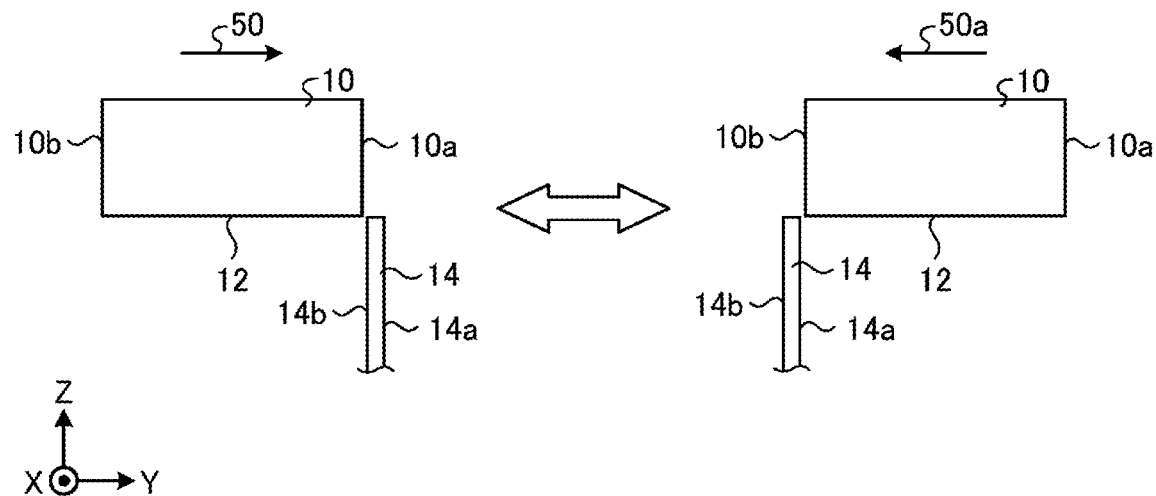
FIG. 6 is a view illustrating an arrangement example of a head and a wiper included in a coating device according to a third embodiment.

FIG. 6 is a view illustrating an arrangement example of a head and a wiper included in a coating device according to a third embodiment. The example illustrated in FIG. 6 differs from the coating device according to the first embodiment illustrated in FIG. 3 in that the nozzle surface 12 can be wiped in both directions of the direction 50 and a direction 50a facing each other along the Y axis direction.

In other words, while the head 10 is moved in the direction 50 along the Y axis positive direction, the nozzle surface 12 is wiped by the second surface 14b of the wiper 14 from the first surface 10a side toward the second surface 10b side. Furthermore, while the head 10 is moved in the direction 50a along the Y axis negative direction, the nozzle surface 12 is wiped by the first surface 14a of the wiper 14 from the second surface 10b side toward the first surface 10a side.

The nozzle surface 12 can be wiped in both directions of the direction 50 and the direction 50a as described above, and thus the wiping performance by the wiper 14 is improved. By wiping from both directions of the direction 50 and the direction 50a, for example, deformation of the discharge holes 11 (refer to FIG. 1) due to the wear of the nozzle surface 12 can be suppressed, and thus the durability of the head 10 is improved.

Variation of Third Embodiment

Figure 7:
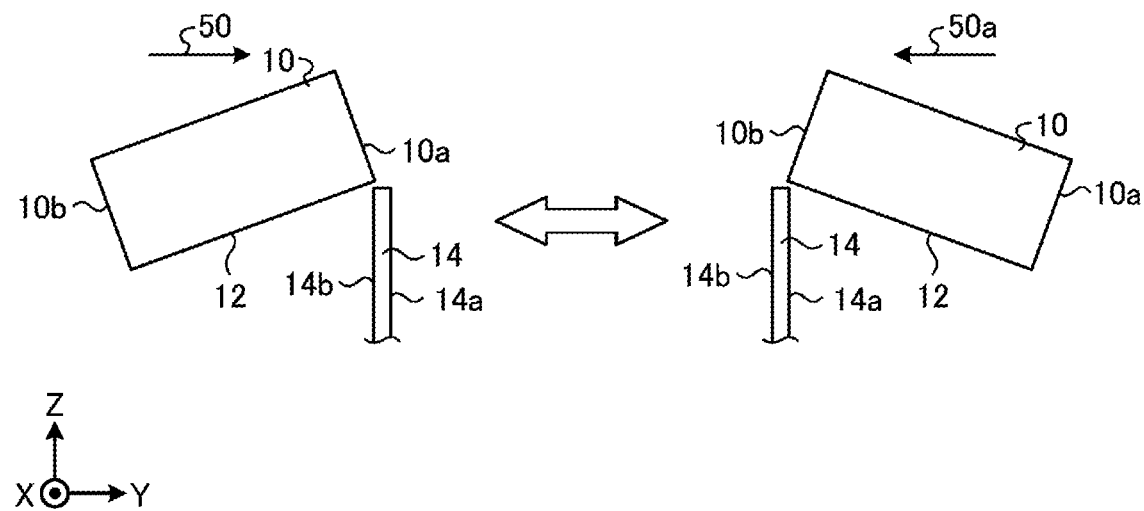
FIG. 7 is a view illustrating an arrangement example of a head and a wiper included in a coating device according to a variation of the third embodiment.

FIG. 7 is a view illustrating an arrangement example of a head and a wiper included in a coating device according to a variation of the third embodiment. The example illustrated in FIG. 7 differs from the coating device according to the second embodiment illustrated in FIG. 4 in that the nozzle surface 12 can be wiped in both directions of the direction 50 and the direction 50a facing each other along the Y axis direction.

In other words, while the head 10 is moved in the direction 50 along the Y axis positive direction in a posture inclined such that the nozzle surface 12 faces the wiper 14 side, the nozzle surface 12 is wiped by the second surface 14b of the wiper 14 from the first surface 10a side toward the second surface 10b side. Furthermore, the head 10 changes the posture of the nozzle surface 12 such that the nozzle surface 12 faces the wiper 14 side and while the head 10 is moved in the direction 50a along the Y axis negative direction, the nozzle surface 12 is wiped by the first surface 14a of the wiper 14 from the second surface 10b side toward the first surface 10a side.

The nozzle surface 12 can be wiped in both directions of the direction 50 and the direction 50a as described above, and thus the wiping performance by the wiper 14 is improved. Furthermore, by changing an inclination of the nozzle surface 12 in both directions of the direction 50 and the direction 50a, the wiping performance of the nozzle surface 12 is improved, and for example, the coating material remaining in the nozzle surface 12 is reduced.

Note that in the example illustrated in FIG. 7, the head 10 has been described as moving along the directions 50 and 50a along the Y axis component, but the embodiment is not limited thereto, and, for example, the head 10 may be moved in a direction along the nozzle surface 12 as illustrated in FIG. 5.

Fourth Embodiment

Figure 8:
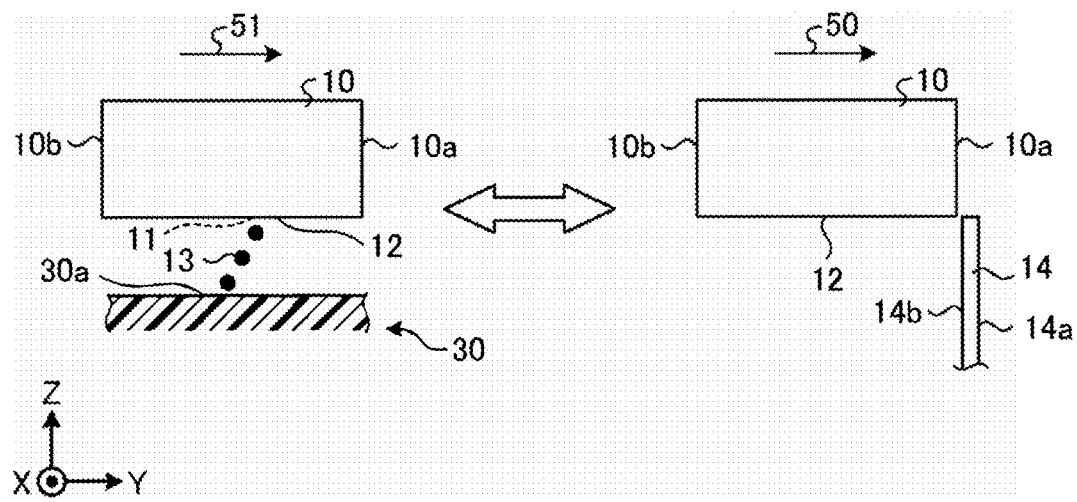
FIG. 8 is a view illustrating an arrangement example of a head and a wiper included in a coating device according to a fourth embodiment.

FIG. 8 is a view illustrating an arrangement example of a head and a wiper included in a coating device according to a fourth embodiment. In the example illustrated in FIG. 8, the direction 50 in which the head 10 is moved when the nozzle surface 12 is wiped, and the direction 51 in which the head 10 is moved when the coating material 13 is discharged from the plurality of discharge holes 11 and the surface of the to-be-coated object 30 facing the nozzle surface 12 is coated are parallel.

As described above, by wiping the nozzle surface 12 by moving the head 10 in the direction 50 along the direction 51 which is the movement direction of the head 10 when coating the to-be-coated object 30, for example, posture control of the head 10 using the robot 20 (refer to FIG. 1) by the controller 41 (operation controller 43) is simplified. Note that the direction 50 in which the head 10 is moved when the nozzle surface 12 is wiped may be a direction facing the direction 51.

Variation of Fourth Embodiment

Figure 9:
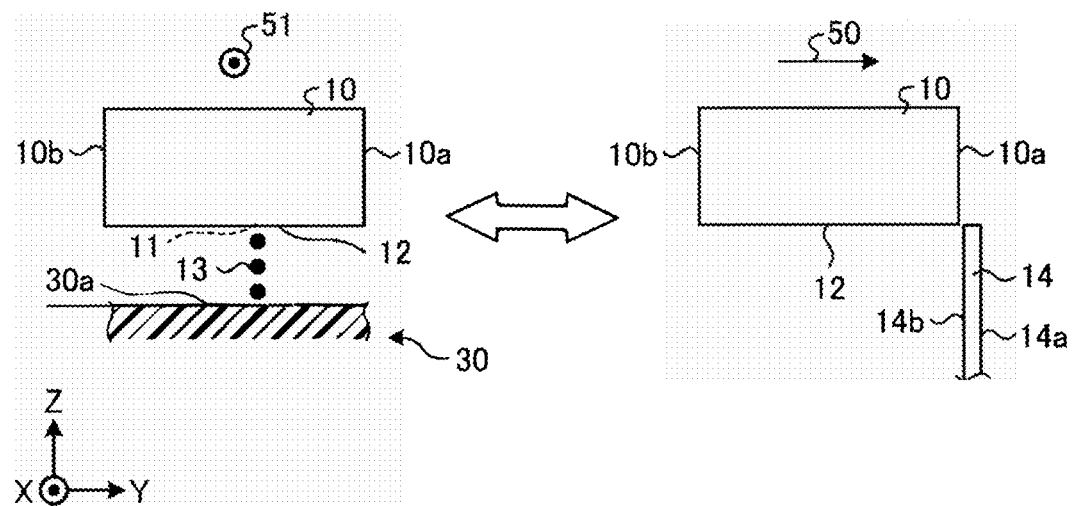
FIG. 9 is a view illustrating an arrangement example of a head and a wiper included in a coating device according to a variation of the fourth embodiment.

FIG. 9 is a view illustrating an arrangement example of a head and a wiper included in a coating device according to a variation of the fourth embodiment. In the example illustrated in FIG. 9, the direction 50 in which the head 10 is moved when the nozzle surface 12 is wiped, and the direction 51 in which the head 10 is moved when the coating material 13 is discharged from the plurality of discharge holes 11 and the surface of the to-be-coated object 30 facing the nozzle surface 12 is coated intersect each other. Specifically, the direction 50 is a direction along the Y axis, and the direction 51 is a direction along the X axis intersecting the Y axis.

As described above, by wiping the nozzle surface 12 by moving the head 10 in the direction 50 intersecting the direction 51 which is the movement direction of the head 10 when coating the to-be-coated object 30, for example, the nozzle surface 12 can be wiped in the middle of switching the moving direction of the head 10, in the head 10 that performs coating while reciprocating between one end side and the other end side of the to-be-coated object 30, and, for example, the coating time can be shortened by reducing the movement distance of the head 10.

Fifth Embodiment

Figure 10:
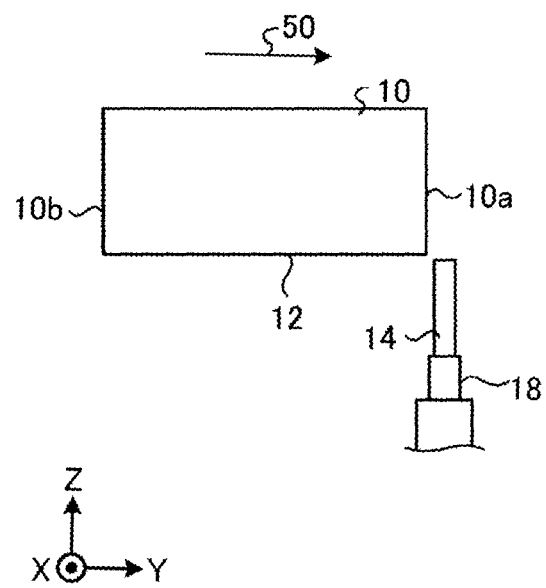
FIG. 10 is a view illustrating an arrangement example of a head and a wiper included in a coating device according to a fifth embodiment.

FIG. 10 is a view illustrating an arrangement example of a head and a wiper included in a coating device according to a fifth embodiment. In the example illustrated in FIG. 10, the wiper 14 is supported by a suspension 18 serving as a buffer mechanism. The suspension 18 adjusts the height of the wiper 14, in other words, the length in the Z axis direction in accordance with the pressing force received by the wiper 14 from the nozzle surface 12, thus buffering the pressing force received by the nozzle surface 12 from the wiper 14. As described above, by including the suspension 18 for supporting the wiper 14, it is possible to absorb a difference of the pressing force received by the nozzle surface 12 from the wiper 14 in accordance with, for example, the position shift and the variation in the movement speed of the head 10.

Sixth Embodiment

Figure 11:
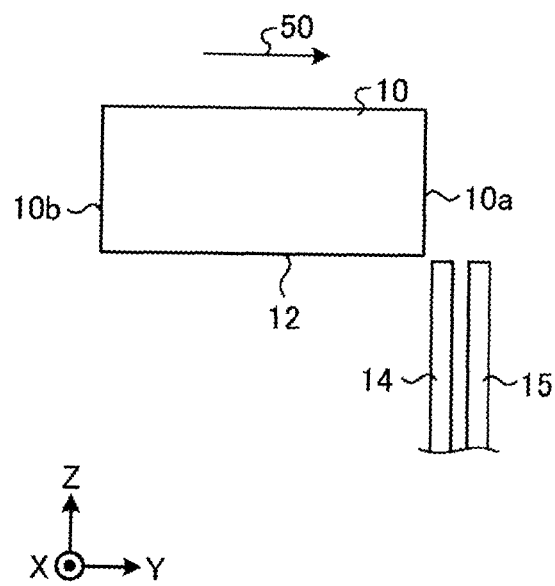
FIG. 11 is a view illustrating an arrangement example of a head and a wiper included in a coating device according to a sixth embodiment.

FIG. 11 is a view illustrating an arrangement example of a head and a wiper included in a coating device according to a sixth embodiment. In the example illustrated in FIG. 11, a plurality of wipers 14 and 15 having different characteristics are included.

The wiper 14 is a so-called wet wiper containing an affinity component for the nonvolatile component contained in the coating material, and the wiper 15 is a so-called dry wiper not containing the affinity component or having a smaller content of affinity component than that of the wiper 14. The wiper 14 is an example of a first wiper, and the wiper 15 is an example of a second wiper.

While the head 10 is moved in the direction 50 along the Y axis positive direction, the nozzle surface 12 is sequentially wiped from the first surface 10a side toward the second surface 10b side by the wipers 14 and 15. By disposing the plurality of wipers 14 and 15 having different characteristics such that specifically the nozzle surface 12 is wiped by the wet wiper and then the dry wiper, a decrease in the coating quality due to the affinity component remaining in the nozzle surface 12 can be prevented, for example.

Note that in the example illustrated in FIG. 11, the wipers 14 and 15 are configured to be arranged in parallel along the direction 50 in which the nozzle surface 12 moves, but there is no restriction on the arrangement as long as the wipers 14 and 15 are included. Nevertheless, in a case where the wipers 14 and 15 are arranged in parallel as illustrated in FIG. 11, the time required for the wiping of the nozzle surface 12 can be shortened for example.

Seventh Embodiment

Figure 12:
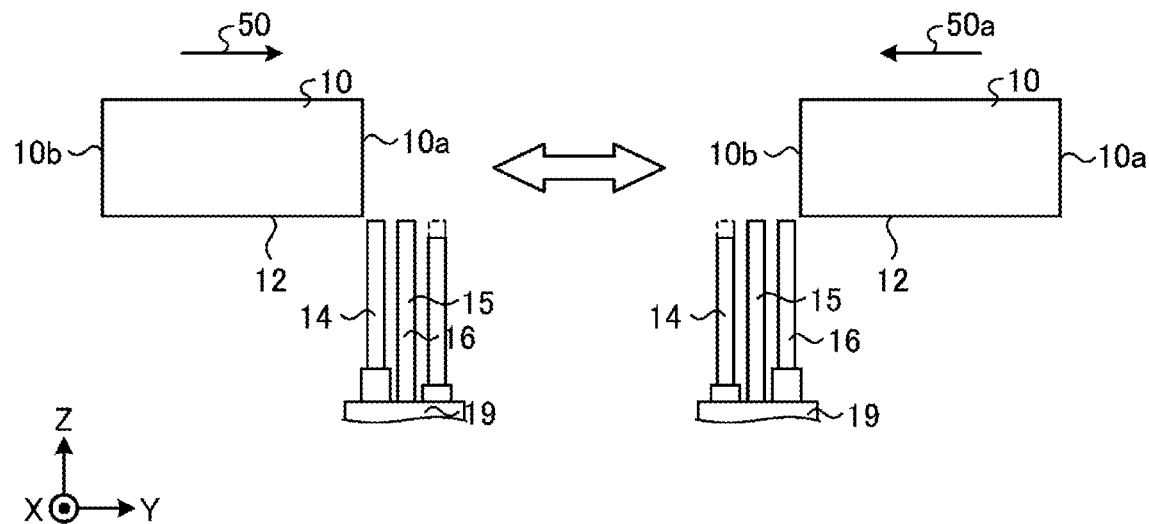
FIG. 12 is a view illustrating an arrangement example of a head and a wiper included in a coating device according to a seventh embodiment.

FIG. 12 is a view illustrating an arrangement example of a head and a wiper included in a coating device according to a seventh embodiment. In the example illustrated in FIG. 12, a plurality of wipers 14 to 16 having different characteristics and an elevating mechanism 19 are included.

The wipers 14 to 16 are arranged in parallel along the Y axis direction. The wipers 14 and 16 are the wet wipers, and the wiper 15 is the dry wiper. The wipers 14 to 16 are examples of the first to third wipers, respectively. Further, the elevating mechanism 19 is configured to allow the wipers 14 to 16 to elevate in accordance with the control of the controller 41.

While the head 10 is moved in the direction 50 along the Y axis positive direction, the elevating mechanism 19 allows the wiper 16 to operate so as to be lower than the height of the wiper 15 in the Z direction and allows the wiper 14 to operate so as to match the height of the wiper 15 in the Z direction. With the operation of the elevating mechanism 19, the nozzle surface 12 is sequentially wiped by the wiper 14 and the wiper 15 from the first surface 10a side toward the second surface 10b side, but is not wiped by the wiper 16.

Furthermore, while the head 10 is moved in the direction 50a along the Y axis negative direction, the elevating mechanism 19 allows the wiper 16 to operate so as to match the height of the wiper 15 in the Z direction and allows the wiper 14 to operate so as to be lower than the height of the wiper 15 in the Z direction. The nozzle surface 12 is sequentially wiped by the wiper 16 and the wiper 15 from the second surface 10b side toward the first surface 10a side, but is not wiped by the wiper 14.

By alternately arranging the plurality of wipers 14 to 16 having different characteristics in this manner and providing the elevating mechanism 19 for changing the positions of the wipers 14 and 16 with respect to the wiper 15 in accordance with the movement direction of the head 10, the nozzle surface 12 can be wiped in both directions of the direction 50 and the direction 50a and thus the wiping performance by the wipers 14 to 16 are improved.

Variation of Seventh Embodiment

Figure 13:
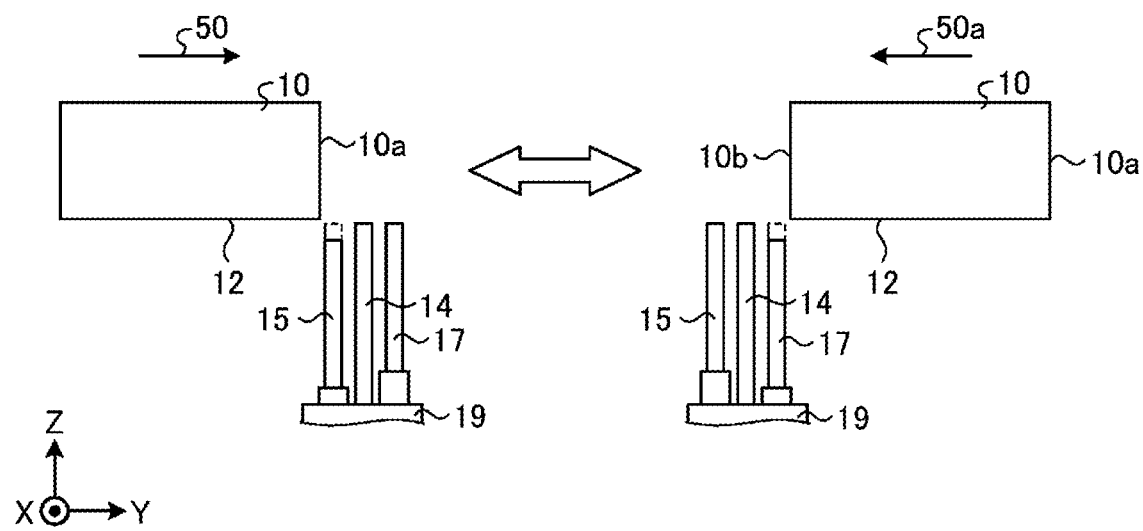
FIG. 13 is a view illustrating an arrangement example of a head and a wiper included in a coating device according to a variation of the seventh embodiment.

FIG. 13 is a view illustrating an arrangement example of a head and a wiper included in a coating device according to a variation of the seventh embodiment. In the example illustrated in FIG. 13, a plurality of wipers 15, 14, and 17 having different characteristics and the elevating mechanism 19 are included.

The wipers 15, 14 and 17 are disposed in order along the Y axis direction. The wiper 14 is the wet wiper, and the wipers 15 and 17 are the dry wipers. The wipers 14, 15, and 17 are examples of the first wiper, the second wiper, and a fourth wiper, respectively. Further, the elevating mechanism 19 is configured to allow the wipers 15 and 17 to elevate in accordance with the control of the controller 41.

While the head 10 is moved in the direction 50 along the Y axis positive direction, the elevating mechanism 19 allows the wiper 15 to operate so as to be lower than the height of the wiper 14 in the Z direction and allows the wiper 17 to operate so as to match the height of the wiper 14 in the Z direction. With the operation of the elevating mechanism 19, the nozzle surface 12 is sequentially wiped by the wiper 14 and the wiper 17 from the first surface 10a side toward the second surface 10b side, but is not wiped by the wiper 15.

Furthermore, while the head 10 is moved in the direction 50a along the Y axis negative direction, the elevating mechanism 19 allows the wiper 15 to operate so as to match the height of the wiper 14 in the Z direction and allows the wiper 17 to operate so as to be lower than the height of the wiper 14 in the Z direction. The nozzle surface 12 is sequentially wiped by the wiper 14 and the wiper 15 from the second surface 10b side toward the first surface 10a side, but is not wiped by the wiper 17.

By alternately arranging the plurality of wipers 15, 14 and 17 having different characteristics in this manner and providing the elevating mechanism 19 for changing the positions of the wipers 15 and 17 with respect to the wiper 14 in accordance with the movement direction of the head 10, the nozzle surface 12 can be wiped in both directions of the direction 50 and the direction 50a and thus the wiping performance by the wipers 15, 14 and 17 are improved.

Eighth Embodiment

Figure 14:
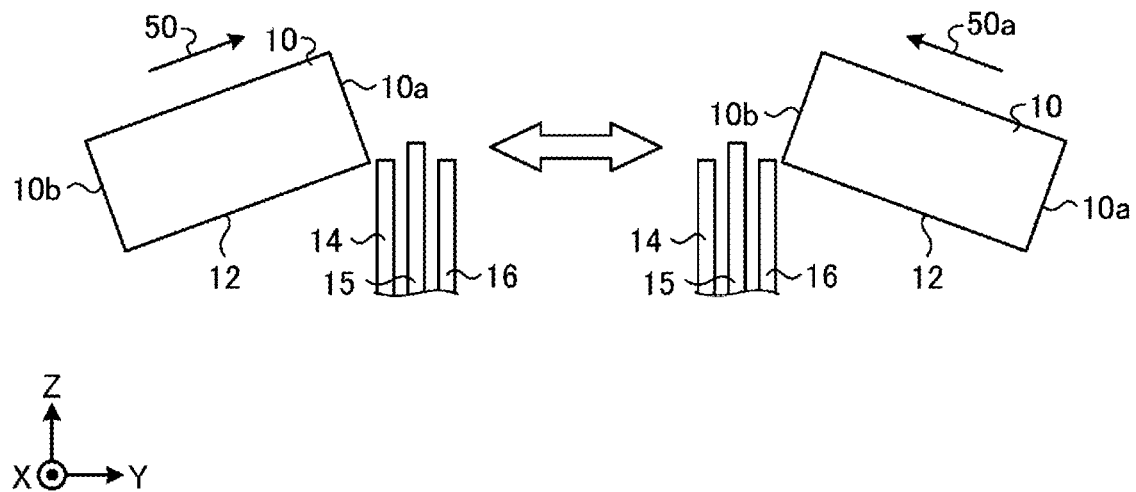
FIG. 14 is a view illustrating an arrangement example of a head and a wiper included in a coating device according to a eighth embodiment.

FIG. 14 is a view illustrating an arrangement example of a head and a wiper included in a coating device according to an eighth embodiment. In the example illustrated in FIG. 14, a plurality of wipers 14 to 16 having different characteristics are included.

The wipers 14 to 16 are arranged in parallel along the Y axis direction. Furthermore, the wiper 15 protrudes with respect to the wipers 14 and 16. The wipers 14 and 16 are the wet wipers, and the wiper 15 is the dry wiper. The wipers 14 to 16 are examples of the first to third wipers, respectively.

While the head 10 is moved in the direction 50 along the nozzle surface 12, the nozzle surface 12 is sequentially wiped by the wiper 14 and the wiper 15 from the first surface 10a side toward the second surface 10b side, but is not wiped by the wiper 16.

Furthermore, while the head 10 is moved in the direction 50a along the nozzle surface 12, the nozzle surface 12 is sequentially wiped by the wiper 16 and the wiper 15 from the second surface 10b side toward the first surface 10a side, but is not wiped by the wiper 14.

By alternately arranging the plurality of wipers 14 to 16 having different characteristics and making the wiper 15 protrude with respect to the wipers 14 and 16 in this manner, for example, the nozzle surface 12 can be wiped in both directions of the direction 50 and the direction 50a and thus the wiping performance by the wipers 14 to 16 are improved.

Furthermore, as illustrated in FIG. 5, the head 10 may be moved in the direction along the nozzle surface 12, and the head 10 may be moved while changing the inclination of the nozzle surface 12 with respect to the wiper 14. In this case, when the head 10 is moved, the arm 21 (refer to FIG. 1) adjusts the angle of the head 10 as appropriate, and thus the wipers 14 to 16 can be selectively brought into contact.

First Variation of Coating Device

Figure 15:
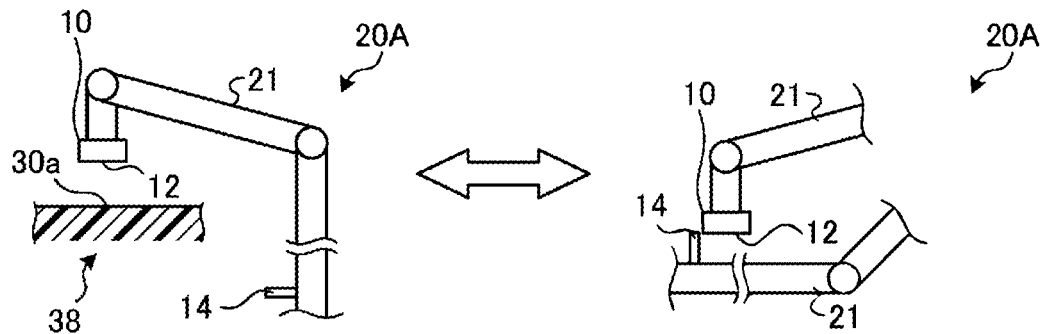
FIG. 15 is an explanatory view of a coating device according to a first variation of an embodiment.

FIG. 15 is an explanatory view of a coating device according to a first variation of an embodiment. The example illustrated in FIG. 15 differs from the coating device 1 according to the embodiment in that the wiper 14 includes a robot 20A fixed to the arm 21. The wiper 14 is fixed to the arm 21, and thus the nozzle surface 12 can be wiped by moving both the head 10 and the wiper 14 relative to each other. Thus, for example, the time required for the wiping of the nozzle surface 12 can be shortened. Furthermore, even in a case where the wiping of the nozzle surface 12 is frequently performed, a loss of time can be reduced. Frequent wiping also has the advantage of improving coating quality.

Second Variation of Coating Device

Figure 16:
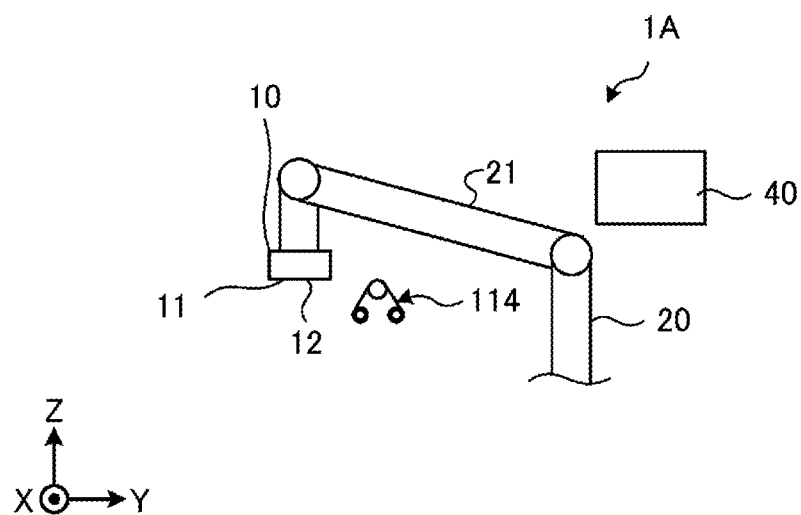
FIG. 16 is an explanatory view of a coating device according to a second variation of an embodiment.

FIG. 16 is an explanatory view of a coating device according to a second variation of an embodiment. A coating device 1A illustrated in FIG. 16 differs from the coating device 1 according to each of the above-described embodiments and variations in that a wiping unit 114 serving as an example of the wiping mechanism is included instead of the wiper 14.

Figure 17:
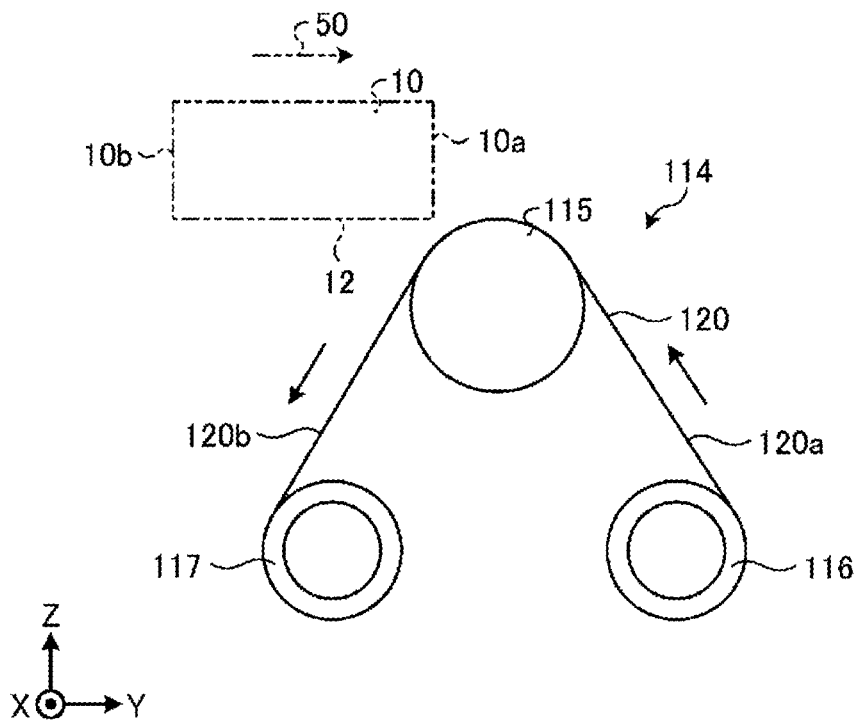
FIG. 17 is an explanatory view of a wiping unit illustrated in FIG. 16.

FIG. 17 is an explanatory view of the wiping unit illustrated in FIG. 16. As illustrated in FIG. 17, the wiping unit 114 includes a pressure roller 115, an unwinding roller 116, a winding roller 117, and a wiping web 120.

The unwinding roller 116 unwinds the wiping web 120. The unwinding roller 116 unwinds a wiping web 120a before a wiping process for the wiping of the head 10 by the wiping unit 114.

The pressure roller 115 presses the wiping web 120 against the nozzle surface 12 of the head 10. The pressure roller 115 is located between the unwinding roller 116 and the winding roller 117. The pressure roller 115 presses the wiping web 120a before wiping, which is unwound from the unwinding roller 116, against the nozzle surface 12 of the head 10. The pressure roller 115 may be rotated or may not be rotated following movement of the wiping web 120.

The winding roller 117 winds the wiping web 120 unwound from the unwinding roller 116. The winding roller 117 winds a wiping web 120b after the wiping, which is passed through the pressure roller 115.

The wiping web 120 may be a flexible material such as, a woven fabric, a nonwoven fabric, a paper, or the like. The wiping web 120 is pressed against the nozzle surface 12 at a pressure within a predetermined range by the pressure roller 115. When the head 10 is moved in a certain direction (for example, in the direction 50 along the Y axis positive direction) while maintaining this state, the coating material, in particular the nonvolatile component such as a pigment and a resin material, attached to the nozzle surface 12 is wiped from the nozzle surface 12.

The wiping web 120 may contain the affinity component having affinity for the nonvolatile component attached to the nozzle surface 12. Here, the term "affinity" is referred to as a property of reducing adhesiveness to the nozzle surface 12 by, for example, swelling, dispersion, dissolution, or the like. When the adhesiveness between the nozzle surface 12 and the nonvolatile component is reduced, the nonvolatile component can be easily wiped. The affinity component having such affinity includes, for example, water, organic solvent, alcohol, oil, and the like, and when the affinity component has volatility, it is possible to suppress a reduction in the coating quality due to a residue of the affinity component on the nozzle surface 12.

The wiping unit 114 may be fixed to the arm 21. In a case where the wiping unit 114 is fixed to the arm 21, the nozzle surface 12 can be wiped by moving both the head 10 and the wiping unit 114 relative to each other. Thus, for example, the time required for the wiping of the nozzle surface 12 can be shortened. Furthermore, even in a case where the wiping of the nozzle surface 12 is frequently performed, a loss of time can be reduced. Frequent wiping also has the advantage of improving coating quality.

The driving of the wiping unit 114 may also be controlled by the control device 40. The control device 40 may control, for example, a winding speed of the wiping web 120 by driving the winding roller 117 and/or the unwinding roller 116, and/or an amount of pressing in which the wiping web 120 is pressed against the nozzle surface 12 via the pressure roller 115. Furthermore, the wiping unit 114 may be controlled by a control mechanism (not illustrated) different from the control device 40.

Each embodiment according to the present invention was described above. However, the present invention is not limited to the embodiments described above, and various modifications can be made without departing from the essential spirit of the present invention. For example, in the embodiments described above, the coating device 1 including the head 10 configured to discharge a single color coating material was described. However, for example, robots 20 respectively holding heads 10 for discharging coating materials of basic colors such as magenta (M), yellow (Y), cyan (C), and black (K) may be included.

Furthermore, in the embodiments described above, the example is illustrated in which the nozzle surface 12 is wiped by the wiper 14 extending toward the Z axis positive direction, but the embodiment is not limited thereto, and for example, the nozzle surface 12 may be wiped by the wiper 14 extending toward the Z axis negative direction, or the nozzle surface 12 may be wiped by the wiper 14 located along the X axis direction or the Y axis direction intersecting the Z axis direction. Furthermore, the nozzle surface 12 may be wiped by the wiper 14 located obliquely with respect to the Z axis.

Similarly, the example is illustrated in which the wiping unit 114 presses the wiping web 120 toward the Z axis positive direction side, but the embodiment is not limited thereto, and for example, the wiping web 120 may be pressed toward the Z axis negative direction, and the wiping web 120 may be pressed in the direction along X axis direction or the Y axis direction intersecting the Z axis direction. Furthermore, the wiping unit 114 may press the wiping web 120 in a direction obliquely directed with respect to the Z axis.

Furthermore, the example is illustrated in which the elastic member having the predetermined hardness is used as the wiper 14, but the embodiment is not limited thereto, and the wiper 14 of non-contact type may be used. The wiper 14 of non-contact type can include a hollow tubular member. The wiper 14 of non-contact type can wipe the nozzle surface 12 in a non-contact state by ejecting air from the inside the tube.

As described above, the coating device 1 according to the embodiment includes the head 10, the wiping mechanism (the wiper 14 and/or the wiping unit 114), the arm 21, and the controller 41. The head 10 includes the nozzle surface 12 for discharging the coating material. The wiping mechanism wipes the nozzle surface 12. The arm 21 holds the head 10. The controller 41 controls the movement of the head 10 via the arm 21. The controller 41 relatively moves the head 10 with respect to the wiping mechanism to wipe the nozzle surface 12. Thus, the configuration can be simplified.

Additional effects and variations can be easily derived by a person skilled in the art. Thus, a wide variety of aspects of the present invention are not limited to the specific details and representative embodiments represented and described above. Accordingly, various changes are possible without departing from the spirit or scope of the general inventive concepts defined by the appended claims and their equivalents.

The invention claimed is:

1. A coating device, comprising:
a head comprising a nozzle surface configured to discharge a coating material;
a wiping mechanism configured to wipe the nozzle surface;
an articulated arm configured to hold the head; and
a controller configured to control movement of the head via the articulated arm, wherein
the controller is configured to:
relatively move the head with respect to the wiping mechanism to wipe the nozzle surface, and
cause the articulated arm to be temporarily stationary before an operation of wiping the nozzle surface,
the controller is configured to
move the head in a posture in which the nozzle surface is inclined with respect to the wiping mechanism, and
move the head while changing an inclination of the nozzle surface with respect to the wiping mechanism.

2. A coating device, comprising:
a head comprising a nozzle surface configured to discharge a coating material;
a wiping mechanism configured to wipe the nozzle surface;
an articulated arm configured to hold the head; and
a controller configured to control movement of the head via the articulated arm, wherein
the controller is configured to:
relatively move the head with respect to the wiping mechanism to wipe the nozzle surface, and
cause the articulated arm to be temporarily stationary before an operation of wiping the nozzle surface,
the wiping mechanism comprises a first surface and a second surface, and
the controller is further configured to:
cause the first surface to wipe the nozzle surface when the head moves in a first direction; and
cause the second surface to wipe the nozzle surface when the head moves in a second direction opposite to the first direction.

3. The coating device according to claim 2, wherein
the controller is configured to change an inclination of the nozzle surface with respect to the wiping mechanism in accordance with a movement direction of the head.

4. The coating device according to claim 1, wherein the wiping mechanism is a plurality of wiping mechanisms having different characteristics.

5. The coating device according to claim 4, wherein the plurality of wiping mechanisms comprises:
a first wiping mechanism containing an affinity component having affinity for a nonvolatile component contained in the coating material, and
a second wiping mechanism configured to wipe the affinity component.

6. A coating device, comprising:
a head comprising a nozzle surface configured to discharge a coating material;
a wiping mechanism configured to wipe the nozzle surface;
an articulated arm configured to hold the head; and
a controller configured to control movement of the head via the articulated arm, wherein
the controller is configured to:
relatively move the head with respect to the wiping mechanism to wipe the nozzle surface, and
cause the articulated arm to be temporarily stationary before an operation of wiping the nozzle surface,
the wiping mechanism is a plurality of wiping mechanisms having different characteristics,
the plurality of wiping mechanisms comprises
a first wiping mechanism containing an affinity component having affinity for a nonvolatile component contained in the coating material,
a second wiping mechanism configured to wipe the affinity component, and
a third wiping mechanism facing the second wiping mechanism and configured to wipe the affinity component, wherein the first wiping mechanism is interposed between the third wiping mechanism and the second wiping mechanism.

7. The coating device according to claim 6, further comprising:
an elevating mechanism configured to change a position of the second wiping mechanism or the third wiping mechanism with respect to the first wiping mechanism in accordance with a movement direction of the head.

8. The coating device according to claim 5, further comprising:
a fourth wiping mechanism facing the first wiping mechanism and containing the affinity component, wherein the second wiping mechanism is interposed between the fourth wiping mechanism and the first wiping mechanism.

9. The coating device according to claim 8, further comprising:
an elevating mechanism configured to change a position of the first wiping mechanism or the fourth wiping mechanism with respect to the second wiping mechanism in accordance with a movement direction of the head.

10. The coating device according to claim 6, wherein
the second wiping mechanism protrudes with respect to the first wiping mechanism and the third wiping mechanism.

11. The coating device according to claim 4, wherein
the plurality of wiping mechanisms is arranged in parallel along a movement direction of the nozzle surface.

12. The coating device according to claim 1, wherein
the controller is configured to move the head in a direction along a movement direction of the head when coating a to-be-coated object to wipe the nozzle surface.

13. The coating device according to claim 1, wherein
the controller is configured to move the head in a direction intersecting a movement direction of the head when coating a to-be-coated object to wipe the nozzle surface.

14. The coating device according to claim 1, further comprising:
a buffer mechanism configured to buffer a pressing force received by the nozzle surface from the wiping mechanism.

15. The coating device according to claim 1, wherein
the wiping mechanism has a hardness between (i) a nonvolatile component contained in the coating material attached to the nozzle surface and (ii) a material of the nozzle surface at a plurality of discharge holes provided in the nozzle surface.

16. The coating device according to claim 1, wherein the wiping mechanism is fixed to the articulated arm.

17. The coating device according to claim 2, wherein the wiping mechanism is fixed to the articulated arm.

18. The coating device according to claim 6, wherein the wiping mechanism is fixed to the articulated arm.

* * * * *